United States Patent [19]

Silverbrook et al.

[11] Patent Number: 5,483,627
[45] Date of Patent: Jan. 9, 1996

[54] PREPROCESSING PIPELINE FOR REAL-TIME OBJECT BASED GRAPHICS SYSTEMS

[75] Inventors: Kia Silverbrook, Woollahra; Michael J. Webb, Lane Cove; Simon R. Walmsley, Epping, all of Australia

[73] Assignees: Canon Kabushiki Kaisha, Tokyo, Japan; Canon Information Systems Research Australia Pty Ltd, Sydney, Australia

[21] Appl. No.: 53,378

[22] Filed: Apr. 28, 1993

[30] Foreign Application Priority Data

Apr. 29, 1992 [AU] Australia ................. PL2142

[51] Int. Cl.⁶ ..................................... G06T 1/00
[52] U.S. Cl. .................. 395/133; 395/138; 395/139; 395/163
[58] Field of Search ......................... 395/118, 119, 395/120, 126–132, 133–139, 141, 155, 161, 162, 163; 364/DIG. 1, DIG. 2, 131–134

[56] References Cited

U.S. PATENT DOCUMENTS

| | | | |
|---|---|---|---|
| 4,675,830 | 6/1987 | Hawkins | 395/139 X |
| 4,885,703 | 12/1989 | Deering | 395/122 |
| 5,255,359 | 10/1993 | Ebbers et al. | 395/161 |
| 5,261,029 | 11/1993 | Abi-Ezzi et al. | 395/123 |
| 5,278,948 | 1/1994 | Luken, Jr. | 395/123 |
| 5,301,267 | 4/1994 | Hassett et al. | 395/151 X |

*Primary Examiner*—Almis R. Jankus
*Attorney, Agent, or Firm*—Fitzpatrick, Cella, Harper & Scinto

[57] ABSTRACT

A method and apparatus is disclosed for preprocessing fragments of two-dimensional graphic objects prior to display in a real-time rasterized format. The apparatus is formed as a pipeline having a translation and scaling section, a filter section, a pre-calculation section, and an interlace correction section. The preferred embodiment is specifically configured to process quadratic polynomial fragments (QPFs) of objects, and to calculate QPFs at high speed thereby permitting real-time rendering on a display. The preferred embodiment also forms part of a real-time object based graphics system.

31 Claims, 9 Drawing Sheets

| | (A) During Scale & Translate | (B) Ready for Filter | (C) Precalculate | (D) After Interlace | (E) Ready for Store |
|---|---|---|---|---|---|
| S0 | Pixel | X | X | X | X |
| S1 | 0 | ΔΔPixel | X | X | X |
| T0 | EndLine | ΔPixel | ΔΔPixel | X | X |
| P0 | 0 | Pixel | ΔPixel | X | X |
| P1 | StartLine | EndLine | Pixel | ΔΔPixel | X |
| P2 | X | StartLine | EndLine | ΔPixel | ΔΔPixel |
| P3 | X | X | StartLine | Pixel | ΔPixel |
| I0 | X | X | X | EndLine | Pixel |
| I1 | X | X | X | StartLine | EndLine |
| L0 | X | X | X | X | StartLine |

*Fig. 6*

Object Data Word Formats

| Label | 15 ... 0 |
|---|---|
| LScale | C \| Integer \| Fraction |
| PScale | C \| Integer \| Fraction |
| ΔPScale | C \| Integer \| Fraction |
| ΔΔPScale | C \| Integer \| Fraction |
| LOffset | S \| Integer |
| POffset | S \| Integer |
| Tag/Level | Object Tag \| E0 \| E1 \| Level |
| *QList(low) | Address15..1 \| T |
| *QList(high) | Address31..16 |

Key:
C: Check Bit
S: Sign Bit
E: Effects Bit
T: Termination Bit

*Fig. 7*

QPF Data Word Formats

| Label | 15 ... 0 |
|---|---|
| StartLine | C \| S \| Integer |
| EndLine | T \| S \| Integer |
| Pixel | S \| Integer |
| ΔPixel | S \| Integer \| Fraction |
| ΔΔPixel | S \| Fraction |

*Fig. 8*

PREPROCESSING PIPELINE FOR REAL-TIME OBJECT BASED GRAPHICS SYSTEMS

BACKGROUND

1. Field of the Invention

The present invention relates to real-time object (RTO) graphics systems and, in particular, discloses a pipeline structure for the preprocessing of object fragment data used for calculating an image to be displayed.

2. Description of the Related Art

Graphics systems in common use normally utilize many different co-ordinate systems in the display of images. The fundamental co-ordinate system is the world co-ordinate system which includes all possible displayable co-ordinates. A second co-ordinate system is the viewing or window co-ordinate system which is used for locating a position or location on a display device such as a screen or printer. A viewing coordinate system is normally forms a 'view port' or 'window' of a certain portion of the world co-ordinate system. Methods of transforming a window coordinate system to its corresponding world co-ordinate system are well known in the art.

Graphic objects used in the display of images, often consist of many different instances of a collection of sub-objects. Each of these sub-objects is normally defined by a further relative co-ordinate system, with the position, scaling, rotation etc. of the sub-object defined relative to an overall position of the object. The use of a relative coordinate system allows the corresponding graphic objects to be easily manipulated through such processes as scaling, translation, coping and rotation. The use of relative co-ordinate systems are well known in the art.

When it comes time to display the objects falling within a certain widow or view port on a graphics display device, a determination must be made of which object, or part thereof, falls within the window or view port, and what shape that object will take upon consideration of the transformations required between the world, viewing and relative coordinate systems. The display of graphic objects is therefore normally achieved by applying the transformation to each object and 'clipping' or culling those objects or portions thereof that lie outside the window or view port.

SUMMARY OF THE INVENTION

It is an object of the present invention to provide an efficient means of processing object based data thereby enabling rapid handling of same for image reproduction.

In accordance with one aspect of the present invention there is disclosed a method of processing fragments of objects, intended to form a raster-based image, the method comprising the steps of:

(i) receiving fragments of the image;

(ii) scaling and translating each fragment of each object according to object vectors preset for each object;

(iii) determining those fragments that will not comprise part of the image and discarding same;

(iv) calculating fragment data for each quadratic polynomial fragment corresponding to that fragment's starting line on the image; and (v) storing all the fragments and their corresponding data prior to calculation of the image.

Preferably, the fragments are processed sequentially in pipeline fashion. Also preferably, after step (iv), interlace correction can be performed where the fragments form part of an interlaced image.

Also preferably, before step (v), the further step of sorting all fragments and their corresponding data into sets based upon the starting line of each said quadratic polynomial fragment in the image is performed.

Preferably, the fragments are quadratic polynomial fragments, but can also take other forms such as cubic splines and the like. Apparatus for performing the method is also disclosed.

BRIEF DESCRIPTION OF THE DRAWINGS

A preferred embodiment of the present invention will now be described with reference to the drawings in which:

FIG. 6A to FIG. 6E show data flow through the preprocessing pipeline of FIG. 5.

FIG. 7 and FIG. 8 Show the formats of object and QPF data respectively;

DETAILED DESCRIPTION OF THE PREFERRED EMBODIMENT

Figure 1:
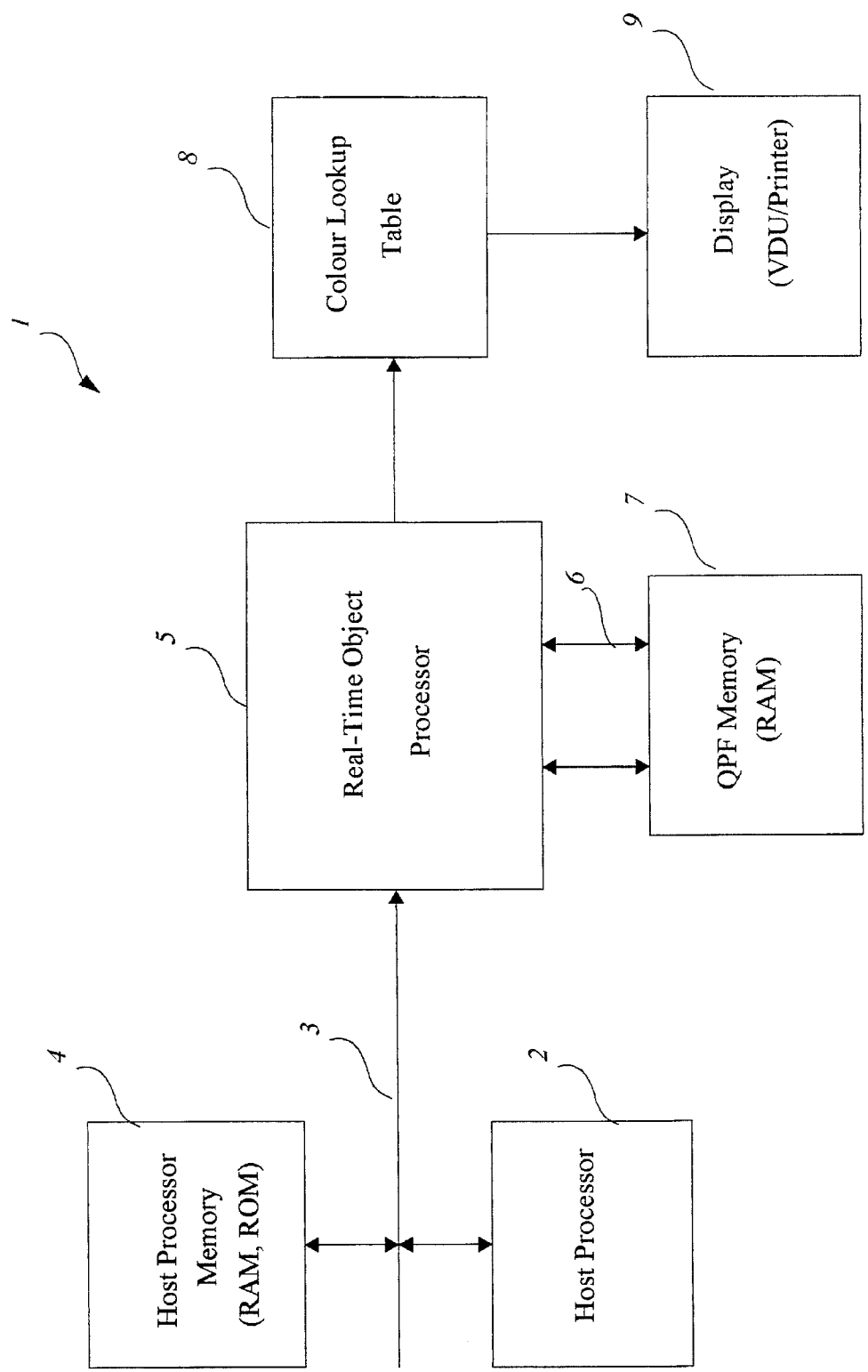
FIG. 1 shows a schematic block diagram of an RTO graphics system.

U.S. patent application Ser. No. 08/053,373, filed Apr. 28, 1993, entitled "A Real-Time Object Based Graphics System" lodged concurrently herewith and the disclosure of which is hereby incorporated by cross-reference, discloses a real-time object (RTO) graphics system 1 shown in FIG. 1 of the present specification which includes a controlling host processor 2 connected via a processor bus 3 to a processor memory 4 which includes ROM and RAM. The host processor 2 operates to form an object list of objects which are used to form an image. The object list is stored in the RAM portion of the processor memory 4 in which the objects can be derived from the ROM portion of the processor memory 4 or alternatively input to the system 10 via any known external means such as a disc drive, a digitising tablet of a graphics workstation or the like.

The object list includes various individual objects in which the outline of each object is described by a plurality of object fragments which, in the preferred embodiment are quadratic polynomial fragments.

Connected to the processor bus 3 is a RTO processor 5 which manipulates objects and their QPFs from the object list so as to output rasterised image data to a colour look-up table 8 for reproduction of the image described by the object list on a display 9 such as a video display unit or printer. The RTO processor 5 also connects via a QPF bus 6 to a QPF memory 7 formed of static RAM which is used for the storage of QPFs whilst the RTO processor 5 is calculating the image data.

Where the host processor 2 generates objects, and/or preformatted objects are available and these objects are configured using cubic polynomials such as Bezier splines, these polynomials can be converted to QPFs in the manner described in U.S. Provisional patent application Ser. No. 08/053,213, filed Apr. 28, 1993, entitled "Bezier Spline to Quadratic Polynomial Fragment Conversion", lodged concurrently herewith and the disclosure of which is hereby incorporated by cross reference.

Figure 2:
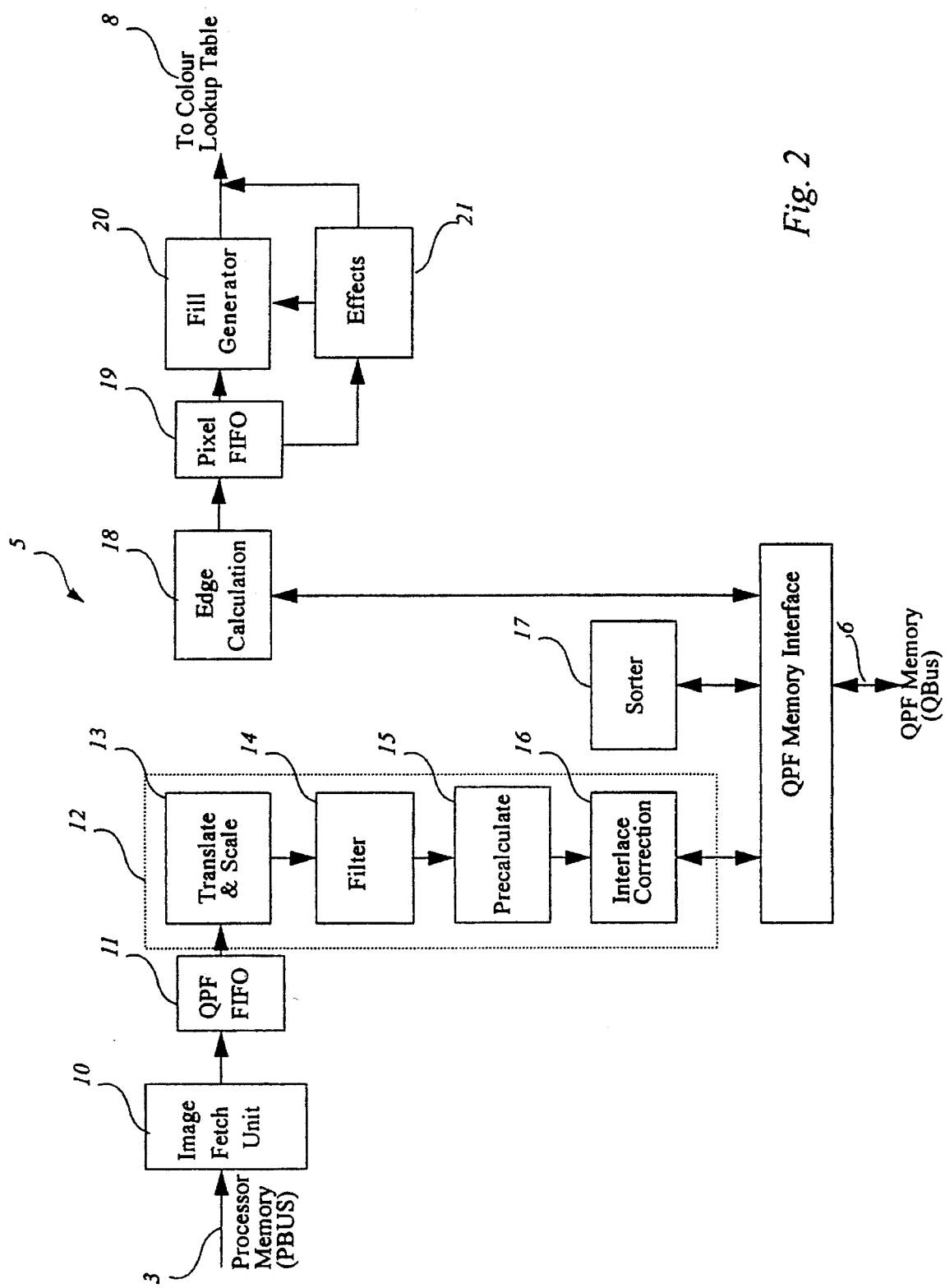
FIG. 2 is a data flow diagram of the RTO processor seen in FIG. 1.

Referring now to FIG. 2, there is shown, a data flow diagram of the RTO processor 5 which shows an image fetch unit 10 connected to the processor memory 4 via the processor bus 3. Objects and their QPFs are fetched from the processor memory 4 by the image fetch unit 10 and are output to a QPF first-in-first-out (QPF FIFO) register 11 which is four words deep. Data in the QPF FIFO 11 is tagged as object data or QPF data. The QPF FIFO 11 is used to decouple fetching from data processing, so as to increase the access efficiency to the processor bus 3.

Data is output from the QPF FIFO 11 into a preprocessing pipeline (PPP) 12 which performs a series of calculations on the data before it is stored in the QPF memory 7. These operations are:

(13) applying scaling and translation factors for the current object to each QPF:

(14) filtering out QPF's which will not effect the display;

(15) iteratively recalculating the values in a QPF which start before the first line of the display, to yield a QPF starting on the first line of the display; and

(16) applying a correction to the QPF's rendering if the image is to be interlaced (as, for example, on a television display).

From the PPP 12, the QPFs are stored in the QPF memory 7. The QPF data is stored as a series of linked lists, one for each line in the image to be formed. After all of the QPFs in the image have been fetched and stored in the QPF memory 7, the linked list for each line is sorted by a pixel sorter 17 in order of pixel value (i.e. position) for each line, in preparation for rendering of the image to the display 9.

In video applications, image preparation of the new image occurs in one half of a double buffered QPF memory, whilst the other half is used for rendering. However, the QPF memory 7 is single ported, so the image preparation and image rendering sections of the RTO processor 5 must compete for access to the QPF bus 6.

Image rendering is commenced in synchronization with the display 9. Rendering consists of calculating the intersection of QPFs with each line on display 9 in turn, where these intersections define the edges of objects. Each edge (or intersection) is used in the calculation of the level which is to be displayed at a particular pixel position on the scan line.

For each line in the image, the render process steps through the list of QPFs for that line, executing the following steps:

copy the pixel value (location), pixel level (colour) and effects information into a pixel FIFO 19 to be picked up for fill generation and calculation;

calculate the values of the QPFs intersection for the next line, or discard QPFs which terminate on the next line; and merge the recalculated QPF into the list of QPF's starting on the next line. Rendering and recalculation has the highest priority on the QPF bus 6, however the QPF bus 6 is freed for storage or sorting access whenever the pixel FIFO 19 is filled, or all the QPFs for the current line have been processed.

Data is sequenced out of the pixel FIFO 19, which is sixteen words deep, under the control of a pixel counter which is incremented by each pixel clock cycle derived from the display 9. The fill generator 20 resolves the priority levels of the objects in the display, and outputs the highest visible level at each pixel position to the colour look-up table 8 prior to display. The fill generation can be modified by an effects block 21, so as to implement visual effects such as transparency.

Figure 3:
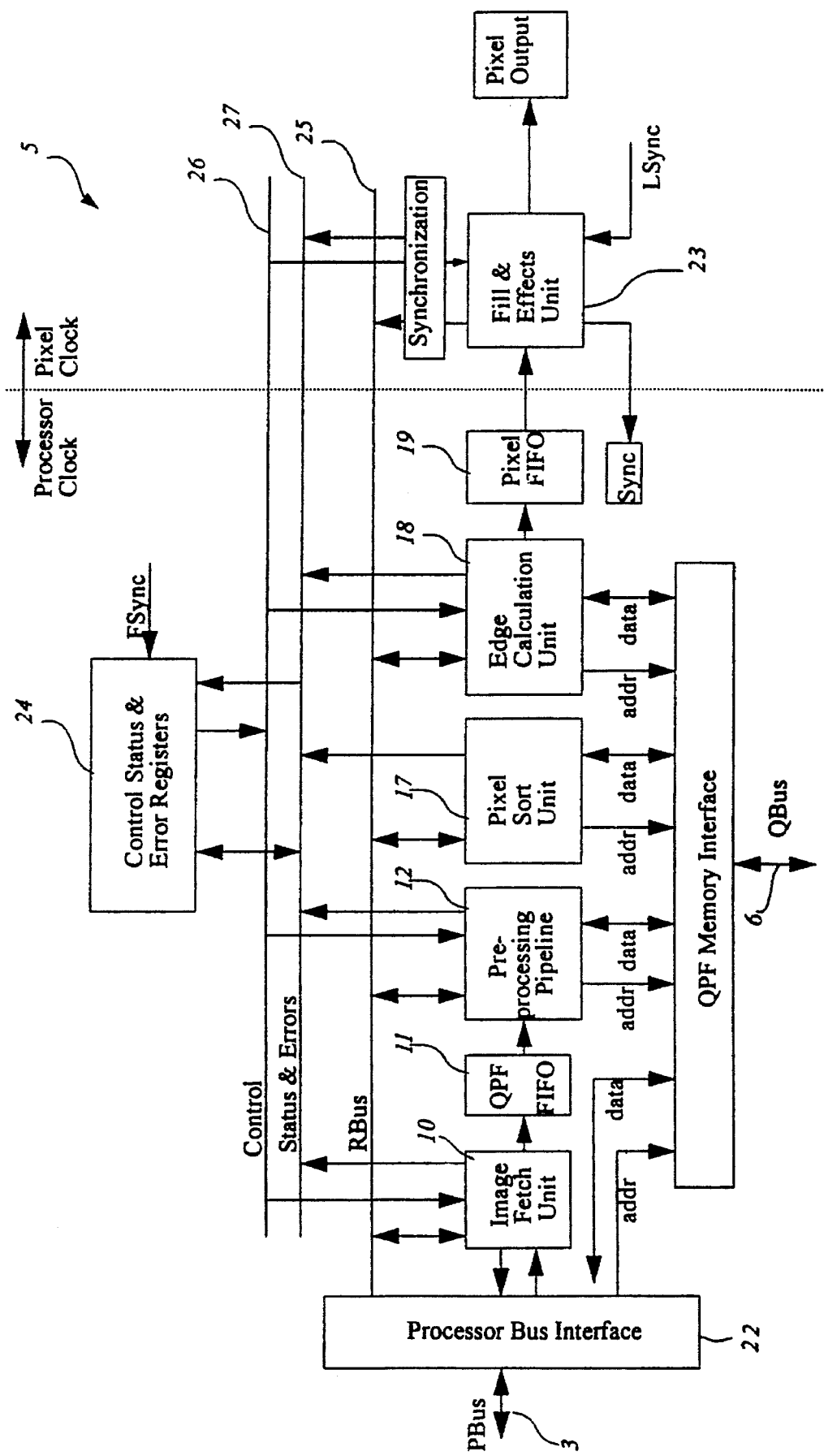
FIG. 3 is a schematic block diagram representation of the RTO processor.

Referring now to FIG. 3, there is shown, the internal structure of the RTO processor 5 is shown in which a processor bus interface 22 interconnects between the processor bus 3 and the image fetch unit 10. The various stages of the data flow diagram of FIG. 2 appear repeated as individual hardware units in FIG. 3 save for the combination of the fill generator 20 and the effects block 21 as a single fill and effects unit 23. A series of control, status and error (CSE) registers 24 is also provided which allows for monitoring of the RTO processor 5 by the host processor 2. This occurs via a register bus (RBUS) 25 which connects to each of the individual blocks of the RTO processor 5 save for the QPF FIFO 11 and pixel FIFO 19. A control bus 26 and a status and error bus 27 are also used to transport data about the RTO processor 5.

It is a specific role of the PPP 12 to preformat object list and QPF data provided by the host processor 2 into a format usable by the pixel sorter 17 and by a edge calculation unit 18, which perform the bulk of high speed processing critical to the operation of the RTO processor 5.

Figure 4:
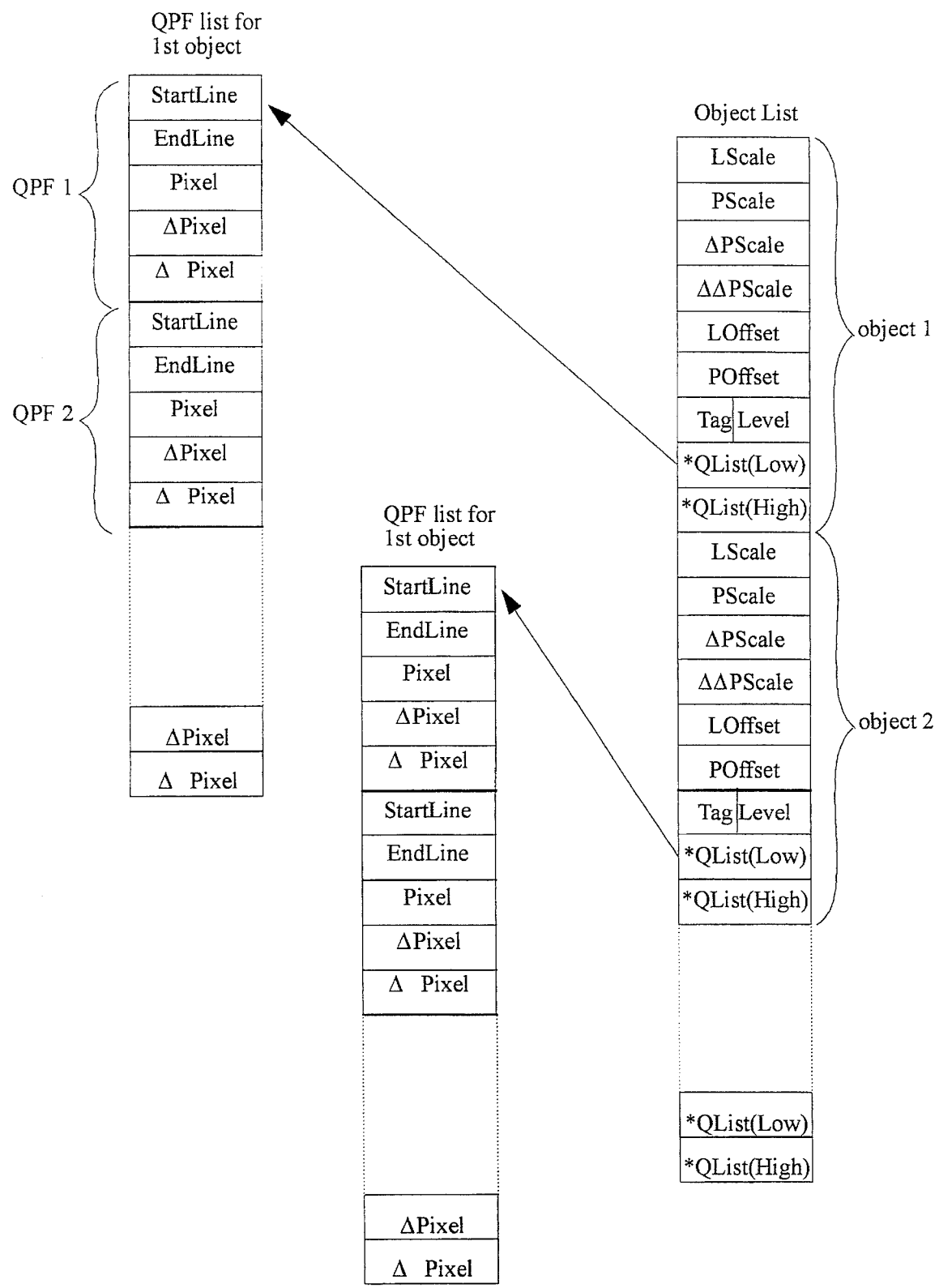
FIG. 4 Shows the object list format output from the host processor of FIG. 1.

Object and QPF data is formatted in the manner disclosed in U.S. patent application Ser. No. 08/053,219, filed Apr. 28, 1993, entitled "Object Based Graphics Using Quadratic Polynomial Fragments", lodged concurrently herewith and the disclosure of which is hereby incorporated by cross-reference, and output from the host processor 2 in the format indicated in FIG. 4 of the present specification.

In the preferred embodiment of the RTO grahics system 1, the objects in the list are placed contiguously in memory, with each object (Object 1, Object 2, . . . ) occupying nine 16 bit locations. The last two words of each object are *QList(low) and *QList(high) which form a pointer to the start of a QPF list for that particular object. The QPF list can reside anywhere in the processor memory 4. The remainder of the object description is made up of scaling and translation factors (LScale, PScale, ΔPScale, ΔΔPScale, LOffset and POffset), the object's level (6 bits) and effects (2 bits) bits (Level), and an 8-bit object tag (Tag)

The storage format of a single object in the object list is shown in FIG. 7.

LOffset represents a palette of colours from which Level selects the actual colour of the object. In this manner, Level and LOftset can address 24 bit colour data permitting over 16 million colours to be displayed using the RTO grahics system 1. Although the RTO processor 5 only outputs Level data, the colour look-up table 8 also has access to the processor bus 3 whereby the host processor 2 can adjust the particular palette, by writing to the colour look-up table 8, to display the appropriate colour for that object.

POffset represents a pixel translation amount (X translation for video display)

LOffset represents a Line translation amount (Y translation for video).

LScale represents a line scaling factor (related to Y size).

PScale represents a pixel scaling factor (related to X size).

ΔPScale represents a pre-calculated factor for scaling ΔPixel to give equivalent X size as PScale.

ΔΔPScale represents a pre-calculated factor for scaling ΔΔPixel to give equivalent X size as PScale.

For each object, the QPFs are listed contiguously in memory, each QPF being made up of five 16 bit words. These are, as described in U.S. patent application Ser. No. 08/053,219, (in order) the START_LINE, the END_LINE, the START_PIXEL, the ΔPIXEL, and the ΔΔPIXEL and the preferred format used in shown in FIG. 8. Both the object list and each QPF list in the processor memory 4 must contain at least one item, as there is no provision for a null list.

A QPF is a mathematical expression of part of an object outline which extends from a start line to an end line within a raster display. The QPF is a curve characterised by a constant change in slope of the line and in this manner, each fragment of any object outline can be described using a quadratic polynomial.

Because each QPF changes slope in a constant manner along its length, each QPF can be readily defined by a number of image parameters. The first of these parameters is the START_LINE which specifies the first line in raster order upon which the QPF appears. The next parameter is the START_PIXEL which specifies the pixel value (i.e. location) of the QPF on the start line. The next parameter is ΔPIXEL which specifies the slope of the line. PIXEL is added to START_PIXEL for each raster line of the display. The next parameter is ΔΔPIXEL specifies the curvature of the line. ΔΔPIXEL is added to ΔPIXEL each raster line. The last parameter is the END_LINE which specifies the last line on which the QPF appears.

There are five operations performed on QPF data as it passes through the PPP 12: scaling, translation, filtering, precalculation, and interlace correction. Of these, scaling and translation are performed independently on each of the QPF components, while the last three functions must be performed on the QPF as a whole. After processing, the QPF is stored in the QPF memory 7 in the format shown in FIG. 9 and described in detail in U.S. patent application Ser. No. 08/053,219.

Pre-processing Pipeline Structure

Figure 5:
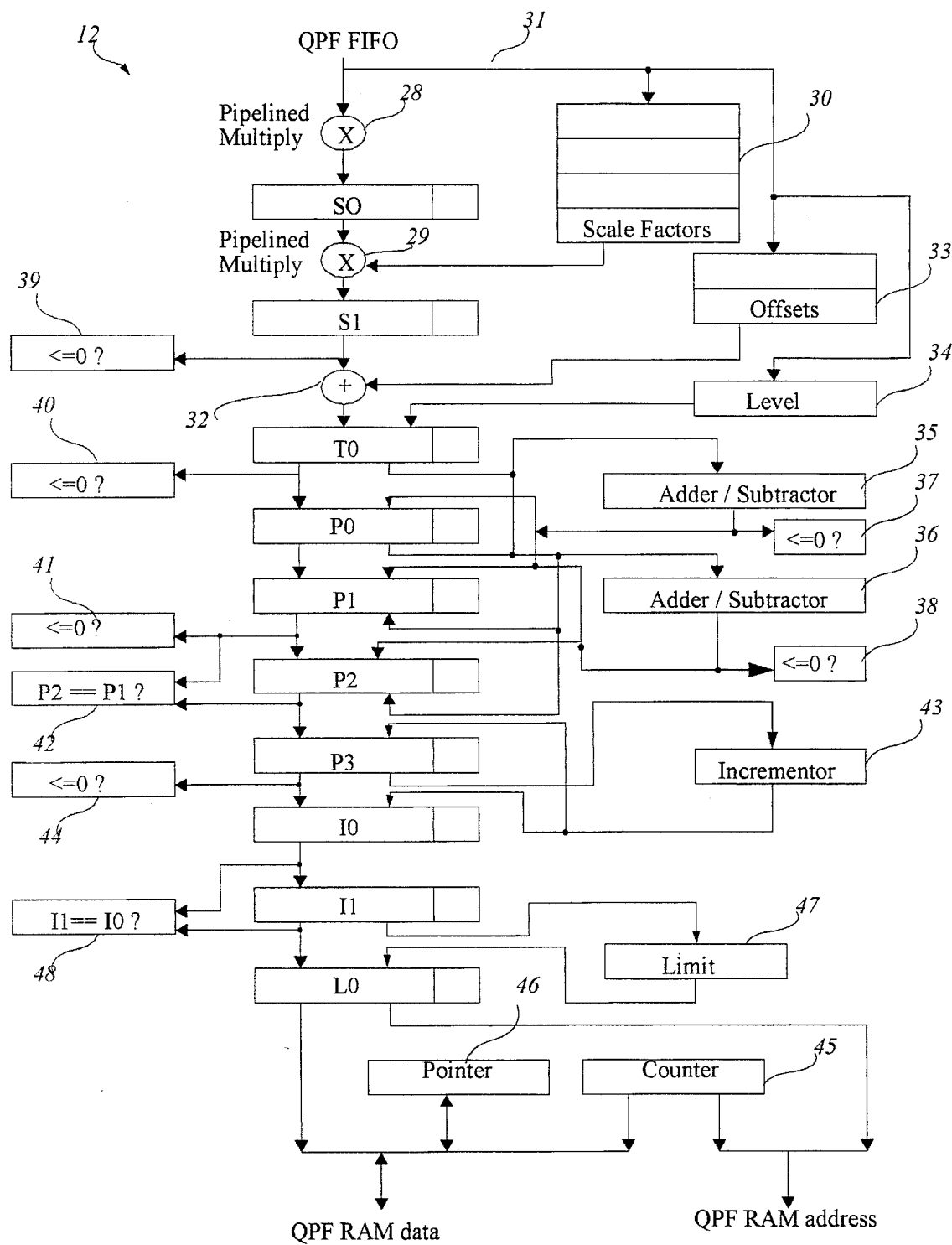
FIG. 5 illustrates a preferred arrangement of the preprocessing pipeline.

The structure of the PPP 12 is shown in FIG. 5. The pipeline consists often registers (S0, S1, T0, P0, P1, P2, P3, I0, I1, and L0), each of which contains a 32-bit fixed point number, a 3-bit tag, and 2 bits for underflow and overflow. The tag indicates which of the five components of a QPF is currently in the register, and is used for local control decoding. The pipeline registers are labelled S0 and S1 for scaling operations, T0 for translation, P0, P1, P2 and P3 for precalculation, I0 and I1 for interlace correction, and L0 for limiting. The main filter operation is performed on registers S1 through P2, before precalculation. Further filtering occurs on registers I1 and I0 after the precalculation and interlace correction has been completed. The scale sections of the PPP 12 contains a 16×16 bit multiplier broken into two pipeline sections 28 and 29. Four 16-bit scale registers 30, which hold the scale factors for each object (seen in FIG. 4), are used to multiply different components of the QPF and output to the multipliers 28 and 29. There are also scale factor data paths 31 from the input of the PPP 12 (from the QPF FIFO 11) to the four 16 bit scale registers 30, to allow loading of the scale factors from the QPF FIFO 11. The first pipeline multiply section 28 outputs to the scale register S0 which supplies one input to the second pipeline multiply section 29 which is also input with the scale factors from the four 16 bit scale registers 30. This outputs to the scale register S1.

The translation section of the PPP 12 contains a 16-bit adder 32, and two 16-bit offset registers 33, which hold the pixel and line offset values for each object. The 16-bit adder 32 can be by-passed for QPF components to which translations do not apply. In addition, an 8-bit level register 34 holds the Level component of the object being pre-processed. The 16-bit adder 32 outputs to the translation register T0 into which the value in the 8-bit level register 34 is merged into the top byte for each QPF ΔPIXEL component.

The first stage of filtering uses two 32-bit adder/subtractors 35 and 36 for magnitude comparisons of the START_LINE and PIXEL_VALUES against a constant MAXPIXEL, indicating the maximum pixel number displayed in a line, and a further constant MAXLINE indicating the maximum line number displayed in an image. The constants MAXPIXEL and MAXLINE are input from the CSE registers 24 where they are set by the host processor 2. The first adder/subtractor 35 subtracts the value of register P0 from MAXPIXEL, whilst the second adder/subtractor 36 subtracts the value of register P2 from MAX LINE. Each of the outputs of the adders 35 and 36 are tested against zero (37 and 38 respectively), but are not stored in any register. Simultaneously, P1, T0 and S1 are also tested against zero (41, 40 and 39 respectively). There is also a first equality comparator 42 to compare the values of registers P2 and P1.

The pre-calculation section of the PPP 12 uses the two adder/subtractors 35 and 36, plus a 16-bit incrementor 43, which perform the additions necessary for the pre-calculation stage. A greater than zero detector 44 on the value of register P3 is used to determine when the pre-calculation is finished.

The interlace correction performed by the PPP 12 operates in two steps. The first step requires the same calculations as pre-calculation, and so uses the same elements of the pipeline, except that the outputs of the two adder/subtractors 35 and 36 are advanced into the next pipeline stage. In the second step, the second adder/subtractor 36 is used to calculate 2P1+P0, while P1 is loaded with a shifted version of P0.

The storing of the QPFs is the final stage of the PPP 12. The storage of QPFs requires a QPF address down counter 45 to point to the next available location for the QPFs in the QPF memory 7. This is initialised from a register MBTA in the CSE registers 24 which points to the appropriate location in the QPF memory 7. There is also a 16-bit pointer register 46 which temporarily holds the previous head-of-list pointer for the line, which is written out as part of the new QPF. The overflow and underflow bits of each QPF component in the register I1 are checked in a checker 47 before storage, and the value of the QPF component is set to the appropriate upper or lower limit if the corresponding bit is set Pre-processing Pipeline Functioning Prior to the commencement of operation, the PPP 12 performs a start-up sequence which consists of writing a zero into each of the start-of-line pointer locations in the line pointer table 50 of the QPF memory 7. The PPP 12 will process QPFs that enter the pipeline during start-up, but will not store any QPFs to memory. To initialise the QPF memory 7, the QPF address down counter 45 is initialised with MAXLINES and then counts down to zero with each QPF being stored. In each cycle, a zero is written to the QPF memory location addressed by the outputs of the QPF address down counter 45. When the counter reaches zero, the QPF address down counter 45 is loaded from the MTBA register, and QPF storage can commerce.

The order of QPF data entering the PPP 12 is: START_LINE, END_LINE, PIXEL, ΔPIXEL, and ΔΔPIXEL. These QPF components are not necessarily available at the start of the PPP 12 in consecutive clock cycles. It is required, however, that the whole QPF be present in consecutive pipeline stages before the filter, pre-calculate and interlace functions can be performed. Consequently, the profess of data through the PPP 12 is not straight forward. FIG. 6(A) to FIG. 6(E) show the state of the pipeline at several points in the progress of a single QPF.

The different QPF components are not guaranteed to enter the PPP 12 in successive cycles, nor will the PPP 12 advance each cycle. As shown in FIG. 6(A), there can be some empty pipeline locations between components of the same QPF in the first part of the PPP 12. However, data will advance into an empty location even if there is a store further along the PPP 12. This allows the data for one QPF to be assembled in consecutive locations.

When a new QPF enters the pipeline from the QPF FIFO 11, the START_LINE value advances through the PPP 12 as far as the register P2, it then stalls in that position. The other QPF components follow, stalling behind the START_LINE, until the five values are in consecutive locations, as illustrated in FIG. 6(B). At this point, all of the scale and translate operations have been completed.

In the next cycle, the comparisons required for the filtering are performed, as the data advances one pipeline stage. If the filtering results (the output of the zero tests 37, 38, 39, and the first equality comparator 42) indicate that the QPF is to be culled, the tag for each of the QPF components is set to INVALID as the pipeline advance occurs, effectively eliminating the QPF from the pipeline. The pipeline is "compressible". Because each stage is individually locked, invalid data simply disappears when its register is clocked with new data, but it is not shifted on. If it is not culled, the QPF will be as shown in FIG. 6(C), ready for pre-calculation.

If required, pre-calculation occurs without the PPP 12 being advanced. The value in register P3 (START_LINE), register P1 (PIXEL) and register P0 (ΔPixel) are updated during each pre-calculation step, until the START_LINE becomes zero.

The data then advances to further pipeline stages during which the interlace corrections are applied to PIXEL, ΔPixel, ΔΔPIXEL and START_LINE, if required. This advances START_LINE to the register I1 stage, with the other QPF components behind, as shown in FIG. 6(D).

The next cycle advances the START_LINE data to the L0 register stage, at the end of the PPP 12. During this advance, an equality comparison 59 is performed between register I0 and I1. If the registers are equal, the QPF is culled. This additional culling is necessary because the data is altered by the pre-calculation and interlace operations. Also, at this step, the underflow and overflow bits for the data in register I1 are examined. These bits are set if the result of any arithmetic operation on the QPF component gives a result which is out of range for that particular component. If one of the bits is set, the data in register I1 is set to the appropriate range of limit checker 47 for the component before being loaded into register L0. The loading of a valid START_LINE into the register L0 initiates a QPF store, in the line list in QPF memory corresponding to that QPF's START_LINE. This requires six QPF memory cycles. The PPP 12 is stalled during the first of these cycles, which is a READ, and advances in each of the following five of these cycles. In general, these memory cycles do not occur in consecutive clock cycles, depending on the requirements of other modules of the RTO processor 5 accessing the QPF bus 6, and on the QPF bus 6 wait state setting.

Scaling and Translation

Scaling and translation applies per-object, scale factors to each QPF in the object. The four scale factors are: SL (line scale), which applies to both START_LINE and END_LINE; SP (pixel scale); SΔP (ΔPixel scale); and SΔΔP (ΔΔPIXEL scale). The two offsets are TL (line offset) and TP (pixel offset). ΔPixel and ΔΔPIXEL are not altered by the translation. In addition, the object's level is held in the 8-bit level register 34 to be merged into the ΔPixel after scaling and translation, while the object's tag is merged into the ΔΔPIXEL value. Data enters the PPP 12 from the QPF FIFO 11 as 16-bit values (integers or fixed point). Each value has a 1-bit tag, which specifies whether the data is an object or a QPF component. A counter (not shown) in the PPP 12 generates the additional tag bits for QPF components based on their order from the QPF FIFO 11, and also distinguishes between different object components. If the tag indicates that the data is part of an object description, the data is loaded into the appropriate scale or translate registers. Otherwise, the data is passed to an input of the first pipeline multiply section 28 and the tag used to select the correct scale and translate values as required in the PPP 12. The QPF tags are loaded into the start of the PPP 12, to progress through the pipeline with the data. The tag values used are indicated below in Table 1.

TABLE 1

| Tag/Count | Component | Load Register | Scale Factor | Translate Factor |
|---|---|---|---|---|
| 0000 | StartLine | — | SL | TL |
| 0001 | EndLine | — | SL | TL |
| 0010 | Pixel | — | SP | TP |
| 0011 | ΔPixel | — | SΔP | 0 |
| 0100 | ΔΔPixel | — | SΔΔP | 0 |
| 0101 | Invalid | — | — | — |
| 0110 | Invalid | — | — | — |
| 0111 | Invalid | — | — | — |
| 1000 | Line Scale | SL | — | — |
| 1001 | Pixel Scale | SP | — | — |
| 1010 | Pixel Scale | SΔP | — | — |
| 1011 | ΔΔPixel Scale | SΔΔP | — | — |
| 1100 | Line Offset | TL | — | — |
| 1101 | Pixel Offset | PL | — | — |
| 1110 | Level/Object | Level/Object | — | — |
| 1111 | Invalid | — | — | — |

The multiplier required for scaling and translation is broken into the two pipeline stages 28 and 29 for ease of implementation. The outputs of the multipliers 28 and 29 are shifted, depending on the component, so that all data is in 32-bit fixed point format, with 16 bits after the binary point. This format is used throughout the remainder of the PPP 12, although the top byte of the ΔPixel value is used for the QPF level information after the translation stage. The pixel and line offset values are integers, and are added to the integer part of the corresponding QPF components.

Filtering

The filtering operation consists of a series of comparisons of components of the QPF, which determine whether the QPF will actually affect what appears in the rendered image.

Any QPF not affecting the render image is discarded to speed up the subsequent processing. QPFs are discarded if, following scaling and translation, any of the following conditions apply:

1. START_LINE=END_LINE (zero length QPF)
2. END_LINE<0 (QPF entirely off top of screen)
3. START_LINE>=MAX LINE (QPF entirely off bottom of screen)
4. PIXEL>=MAXPIXEL and ΔPixel>=0 and ΔΔPIXEL>=0. (entirely to right of screen)

The positions of the various QPF components during filtering are shown in FIG. 6(C). The register operations are:

Condition 1: P2=P1
Condition 2: P2>=0
Condition 3: MAXLINE-P2>0
Condition 4: MAXPIXEL-P0>=0; T0>=0; S1>=0.

The greater than zero comparisons 37, 38, 39 require only the most significant bit of the register to be tested. The first equality comparator 42 is a 16-bit XOR operation. If any of the four conditions is true, the tags for all five components of the QPF are set to INVALID.

Pre-Calculation

The pre-calculation sections work on a QPF in registers P3 back to register T0. The QPF is stalled in this position if the START_LINE (in register P3) is less than zero. Three calculations are performed every clock cycle, and the results tested to determine if the process is finished. The calculations are indicated below in Table 2.

TABLE 2

| Register Operations | QPF Component Changes | Test |
|---|---|---|
| P1 = P1 + P0 | PIXEL = PIXEL + ΔPIXEL | |
| P0 = P0 + T0 | ΔPIXEL = ΔPIXEL + ΔΔPIXEL | |
| P3 = P3 + 1 | START_LINE = START_LINE + 1 | if START_LINE < 0 repeat |

The three additions are performed every clock cycle, using the first adder/subtractor 35 and second adder/subtractor 36 and the 16-bit incrementor 43. The pipeline does not advance at all during the pre-calculation. The results from each of the three steps are written back into the same registers (P3, P1 and P0 respectively).

Interlace Correction

The interlace correction section of the PPP 12 modifies QPFs so that they can be rendered correctly when the RTO processor 5 is operating in an interlaced mode where the image is to be displayed on an interlaced display such as a television screen. This is done under the control of two bits obtained from the CSE registers 24. The first bit is an INT bit which is set to indicate that interlacing is turned ON. The second bit is an ODD control bit that indicates that the frame passing through the PPP 12 is to be rendered on odd or even lines. If the INT bit is not set, then all QPFs pass through the interlace section unchanged.

All QPFs read into the RTO processor 5 are prepared in the processor memory 4 assuming that they will be rendered non-interlaced, so there are two corrections that must be made. Firstly, if the QPF starts on an odd line when the even frame is being prepared, or vice versa, it is necessary to move one line along the QPF, so that the START_LINE has the correct sense. This requires changes to the START_LINE, PIXEL and ΔPixel. Secondly, the ΔPixel and Δ PIXEL values of all QPFs are corrected so that the QPF follows the correct path when rendered on every second line.

The two stages of correction are formed in two consecutive cycles. Before the correction, the components of the QPF are positioned in the pipeline as shown in FIG. 6(C), with the START_LINE in register P3. In the next two cycles, the pipeline advances and the operations shown in Table 3 below are performed.

TABLE 3

| Register | Operations | QPF Component Changes | Application |
|---|---|---|---|
| Cycle 1 | P2 = P1 + P0 | PIXEL = PIXEL + ΔPixel | Odd/Even only |
| | P1 = P0 + T0 | ΔPixel = ΔPixel + Δ PIXEL | |
| | I0 = P3 + 1 | START_LINE = START_LINE + 1 | |
| Cycle 2 | P2 = 2*P1 + P0 | ΔPixel = 2* ΔPixel + Δ PIXEL | All QPFs |
| | P0 = 4*P0 | Δ Pixel = 4* Δ PIXEL | |

Limiting and Secondary Filtering

In the final preprocessing step, START_LINE advances to register L0. During this cycle, registers I1 and I0 are compared by second equality comparator 48 and if they are equal, the QPF is culled. This extra step is required because both the pre-calculation stage and the interlace correction can alter the START_LINE value, so that the previous START_LINE ==END_LINE test 42 needs to be repeated. As the data advances into register L0, it is also adjusted if any of the previous arithmetic operations has resulted in overflow or underflow. This applies to all data as it advances into register L0, not just the START_LINE. The overflow and underflow bits are set at each calculation stage of the PPP 12. If overflow has occurred, the value is set to the maximum possible value for that component, which varies depending upon the component. If underflow has occurred, the value is set to the minimum possible value.

Storing

Figure 9:
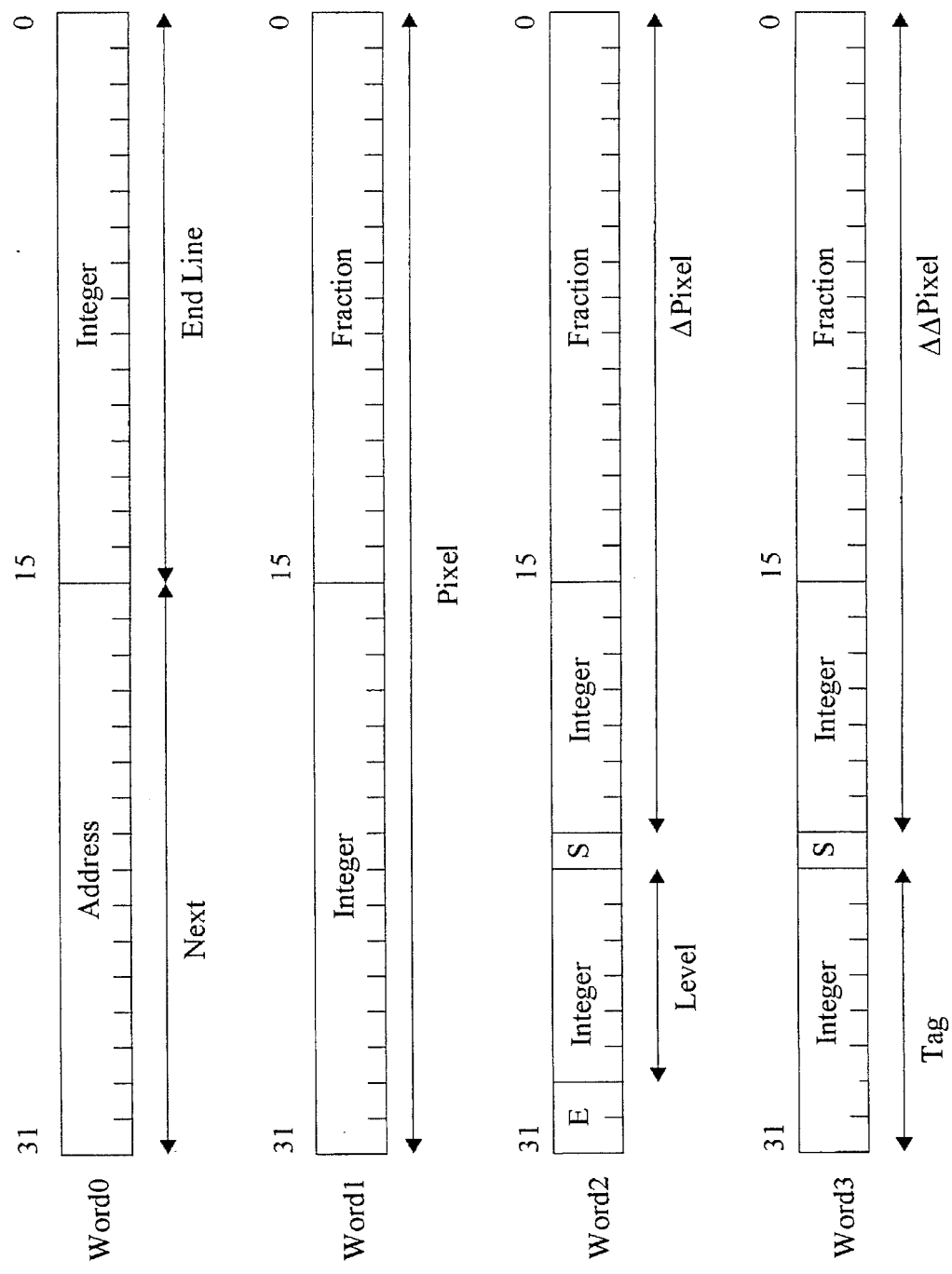
FIG. 9 shows the arrangement of QPF data as stored in the QPF memory.

When a QPF reaches the end of the PPP 12, it is stored in the QPF memory 7 in the format shown in FIG. 9. The store is initiated when a valid START_LINE is advanced into the register L0. The PPP 12 initiates a read to the address denoted by START_LINE, and stores the result in a NEXT register, which acts as a pointer within the QPF memory 7, to the next QPF for that particular object. At the same time, the QPF address down counter 45 is clocked, yielding the base address of the next available 4-word location in QPF memory. During this read cycle, the PPP 12 stalls, leaving the START_LINE in register L0. In the next cycle, the base address is written to the address denoted by START_LINE, linking the new QPF location into the list for the line. The pipeline then advances, bringing END_LINE into the register L0. In the following four bus cycles, four writes are performed, based on the base address. In order, these writes are: NEXT/END_LINE to base 00; PIXEL to base 01; ΔPixel to base 10; and ΔΔPIXEL to base 11. The QPF preprocessing is then complete.

Figure 10:
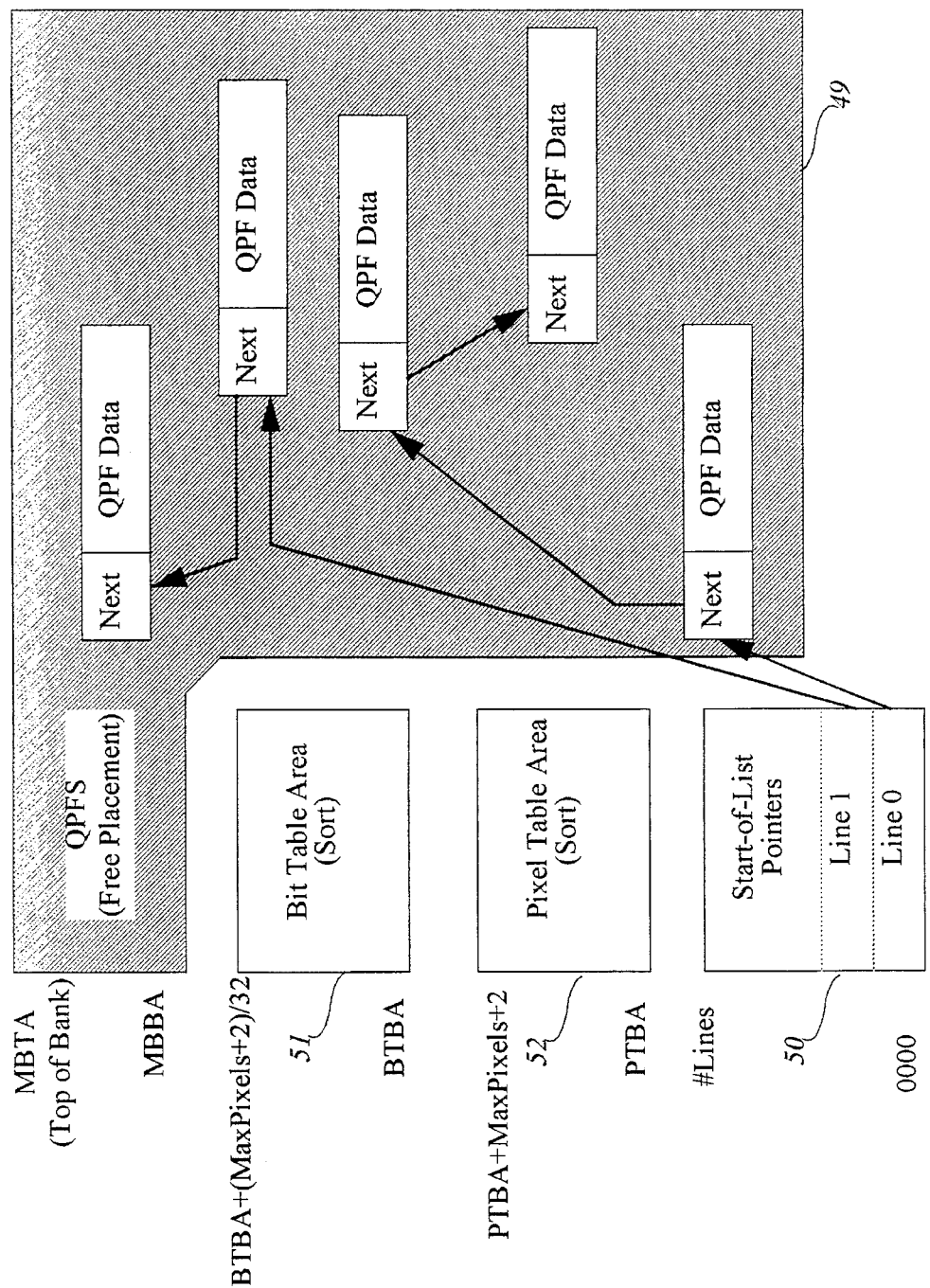
FIG. 10 shows the QPF memory as configured after preprocessing.

The QPF memory 7 as seen in FIG. 10 is configured with QPF free storage space 49 in which the QPF linked lists are stored. A line pointer table 50 is also provided which includes the pointers for each linked list. A bit table area 51 and pixel table area 52 are also allocated, and are used in the QPF sorting process, which follows preprocessing.

The foregoing describes only one embodiment of the present invention and modifications, obvious to those skilled in the art can be made thereto without departing from the scope of the present invention. For example, the invention is applicable to processing fragments of (cubic) spline base graphic objects and the only changes required is a reconfiguring of the arithmetic calculations, as would be appreciated by those skilled in the art. At the time of drafting this specification, technology is not available at commercial prices that would permit such calculations to be performed for real-time object graphics.

We claim:

1. A method for processing two-dimensional graphic objects intended to form a raster-based image, said method comprising the steps of:

(i) receiving the two-dimensional graphic objects, each of the two-dimensional graphic objects including at least one fragment that defines a single curve portion of the two-dimensional graphic object;

(ii) scaling and translating each fragment of each two-dimensional graphic object based on object vectors preset for each two-dimensional graphic object;

(iii) a first determining step for determining a first group of fragments which do not comprise part of the raster-based image and discarding the first group of fragments;

(iv) a second determining step for determining a second group of fragments which comprise part of the raster-based image;

(v) calculating fragment data for each fragment in the second group of fragments, the fragment data corresponding to that fragment's starting line on the raster-based image; and (vi) storing the second group of fragments and the corresponding fragment data for each fragment in the second group of fragments, and not storing the first group of fragments, prior to calculating the raster-based image.

2. A method as claimed in claim 1, wherein the fragments are processed sequentially in pipeline fashion.

3. A method as claimed in claim 1, wherein, between said steps of calculating and storing, interlace correction is performed.

4. A method as claimed in claim 1, further comprising, before said storing step, a step of sorting the second group of fragments and their corresponding fragment data into sets based upon the starting line of each fragment in the raster-based image.

5. A method as claimed in claim 1, wherein each of the fragments that defines a single curve portion of the two-dimensional graphic object describes the single curve portion of the two-dimensional graphic object by means of polynomial equation constants.

6. A method as claimed in claim 5, wherein the fragments comprise quadratic polynomial fragments.

7. A method as claimed in claim 6, wherein each of the quadratic polynomial fragments includes:

a start line value corresponding to a line on which the quadratic polynomial fragment commences;

an end line value corresponding to a line on which the quadratic polynomial fragment ends;

a pixel value corresponding to a pixel position of the line on which the quadratic polynomial commences;

a gradient value corresponding to a gradient of the quadratic polynomial fragment on the line on which the quadratic polynomial fragment commences; and a gradient derivative value corresponding to a derivative of the gradient of the quadratic polynomial fragment.

8. A method as claimed in claim 7, wherein said step of scaling and translating includes multiplying the start line value and the end line value by a line scale factor.

9. A method as claimed in claim 7, wherein said step of scaling and translating includes multiplying the pixel value by a pixel scale factor.

10. A method as claimed in claim 7, wherein said step of scaling and translating includes multiplying the gradient value by a gradient value scale factor.

11. A method as claimed in claim 7, wherein said step of scaling and translating includes multiplying the gradient derivative value by a gradient derivative value scale factor.

12. A method as claimed in claim 7, wherein said step of scaling and translating includes adding a line translation factor to the start line value and the end line value.

13. A method as claimed in claim 7, wherein said step of scaling and translating includes adding a pixel translation factor to the pixel value.

14. A method as claimed in claim 7, wherein said step of calculating fragment data includes alteration of the start line value, alteration of the line value, and alteration of the gradient value for quadratic polynomial fragments that line partially outside of the raster-based image to values corresponding to values the start line value, the end line value, and the gradient value would have on an initial line of the raster-based image.

15. A method as claimed in claim 14, wherein the alteration of the start line value, alteration of the end line value, and alteration of the gradient value includes:

adding the gradient value to the pixel value;

adding the gradient derivative value to the gradient value; and incrementing the start line value until it corresponds to a value which forms part of the raster-based image.

16. A method as claimed in claim 15, wherein interlace correction is performed between said step of calculating and said step of storing, said interlace correction including the step of:

recalculating a start line value, recalculating a pixel value, and recalculating a gradient value for each quadratic polynomial fragment starting on an odd line in an even frame of the raster-based image so that the start line value, the pixel value, and the gradient value correspond to a quadratic polynomial fragment starting on a next line.

17. A method as claimed in claim 16, wherein said step of recalculating a start line value, recalculating a pixel value, and recalculating a gradient value includes:

incrementing the start line value;

adding the gradient value to the pixel value; and adding the gradient derivative value to the gradient value.

18. A method as claimed in claim 16, wherein said interlace correction further comprises a step of altering the gradient value and the gradient derivative value to correspond to an interlaced display.

19. A method as claimed in claim 18, wherein said step of altering the gradient value and the gradient derivative value includes the steps of:

adding twice the gradient value and the gradient derivative value to the gradient value; and multiplying the gradient value by four.

20. A method as claimed in claim 7, wherein the pixel value, the gradient value and the gradient derivative value are limited to predetermined maximum or minimum values.

21. A method as claimed in claim 1, wherein each two-dimensional graphic object includes object vector data, the object vector data including a line scale factor, a pixel scale factor, a gradient value scale factor and a gradient derivative value scale factor.

22. A method as claimed in claim 1, wherein each two-dimensional graphic object includes object vector data including a line translation factor and a pixel translation factor.

23. A method as claimed in claim 1, wherein said first determining step includes determining fragments whose length is zero and including the fragments in the first group of fragments.

24. A method as claimed in claim 23, wherein said first determining step includes determining whether a start line value of a fragment is equal to an end line value of the fragment, and, in the case that the start line value is equal to the end line value, including the fragment in the first group of fragments.

25. A method as claimed in claim 23, wherein said first determining step includes determining, for a current fragment, that if its end line value is less than zero, the current fragment should be included in the first group of fragments.

26. A method as claimed in claim 23, wherein said first determining step includes determining, for a current fragment, that if its start line value is greater than a maximum number of displayable lines in the raster-based image, the current fragment should be included in the first group of fragments.

27. A method as claimed in claim 23, wherein said first determining step includes determining, for a current fragment, that if its pixel value is greater than a maximum number of pixels on a line, its gradient value is greater than or equal to zero, and its gradient derivative value is greater than or equal to zero, the current fragment should be included in the first group of fragments.

28. Apparatus for processing two-dimensional graphic objects intended to form a raster-based image, said apparatus comprising:

(i) receiving means for receiving the two-dimensional graphic objects, each of the two-dimensional graphic objects including at least one fragment that defines a single curve portion of the two-dimensional graphic object;

(ii) scaling means for scaling and translating each fragment of each two-dimensional graphic object based on object vectors preset for each two-dimensional graphic object;

(iii) first determining means for determining a first group of fragments that do not comprise part of the raster-based image, and discarding the first group of fragments;

(iv) second determining means for determining a second group of fragments which comprise part of the raster-based image;

(v) calculating means for calculating fragment data for each fragment in the second group of fragments, the fragment data corresponding to that fragment's starting line on the raster-based image; and (vi) storing means for storing the second group of fragments and the corresponding fragment data for each fragment in the second group of fragments, and not storing the first group of fragments, prior to calculating the raster-based image.

29. An apparatus according to claim 28, wherein the raster-based image is displayed on a rasterised display, said rasterised display being one of a video display unit and a printer.

30. An apparatus according to claim 28, wherein the fragments of the two-dimensional graphic objects are selectively input to said apparatus by a host processor.

31. An apparatus according to claim 28, wherein the fragments of the two-dimensional graphic objects are selectively input to said apparatus by a host processor, and said raster-based image is displayed on a rasterised display.

* * * * *

UNITED STATES PATENT AND TRADEMARK OFFICE
CERTIFICATE OF CORRECTION

PATENT NO. : 5,483,627

DATED : January 9, 1996

INVENTORS : Kia Silverbrook, et al.

It is certified that error appears in the above-identified patent and that said Letters Patent is hereby corrected as shown below:-

COLUMN 1

Line 21, "is" should be deleted.

COLUMN 3

Line 4, "preformated" should read --preformatted--; and
   Line 7, "Provisional" should be deleted.

COLUMN 4

Line 64, "Line" should read --line--.

COLUMN 5

Line 10, "in" (first occurrence) should read --is--; and
   Line 28, "specifies" should read --which specifies--.

COLUMN 7

Line 10, "profess" should read --progress--.

COLUMN 11

Line 12, "is a" should read --are--.

UNITED STATES PATENT AND TRADEMARK OFFICE
CERTIFICATE OF CORRECTION

PATENT NO. : 5,483,627

DATED : January 9, 1996

INVENTORS : Kia Silverbrook, et al.

It is certified that error appears in the above-identified patent and that said Letters Patent is hereby corrected as shown below:

COLUMN 12

Line 28, "line" should read --lie--.

Signed and Sealed this

Twenty-third Day of July, 1996

Attest:

BRUCE LEHMAN

Attesting Officer

Commissioner of Patents and Trademarks